June 18, 1957  J. CAVALLIER  2,795,972
SPEED CHANGE MECHANISM
Filed Sept. 23, 1953  3 Sheets-Sheet 1
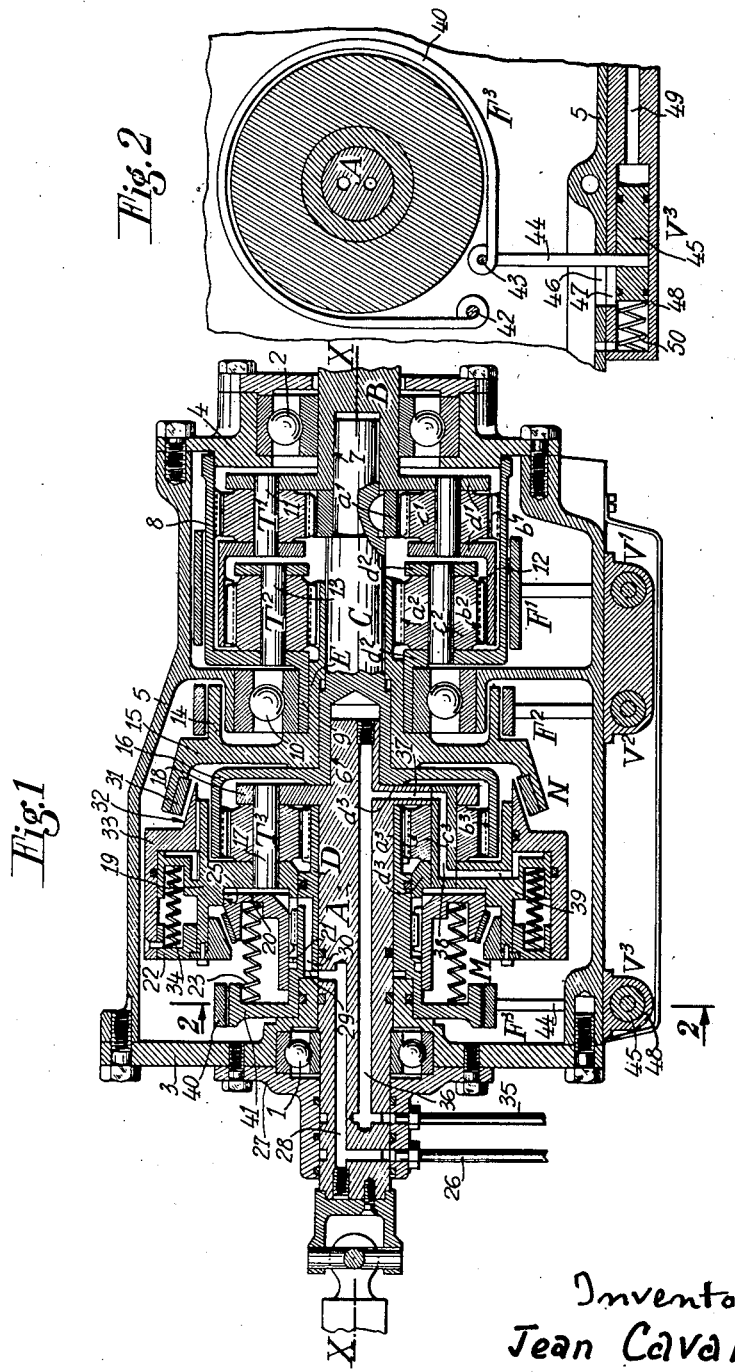
Inventor:
Jean Cavallier
by: J. Delattre-Seguy
Attorney June 18, 1957  J. CAVALLIER  2,795,972
SPEED CHANGE MECHANISM
Filed Sept. 23, 1953  3 Sheets-Sheet 2
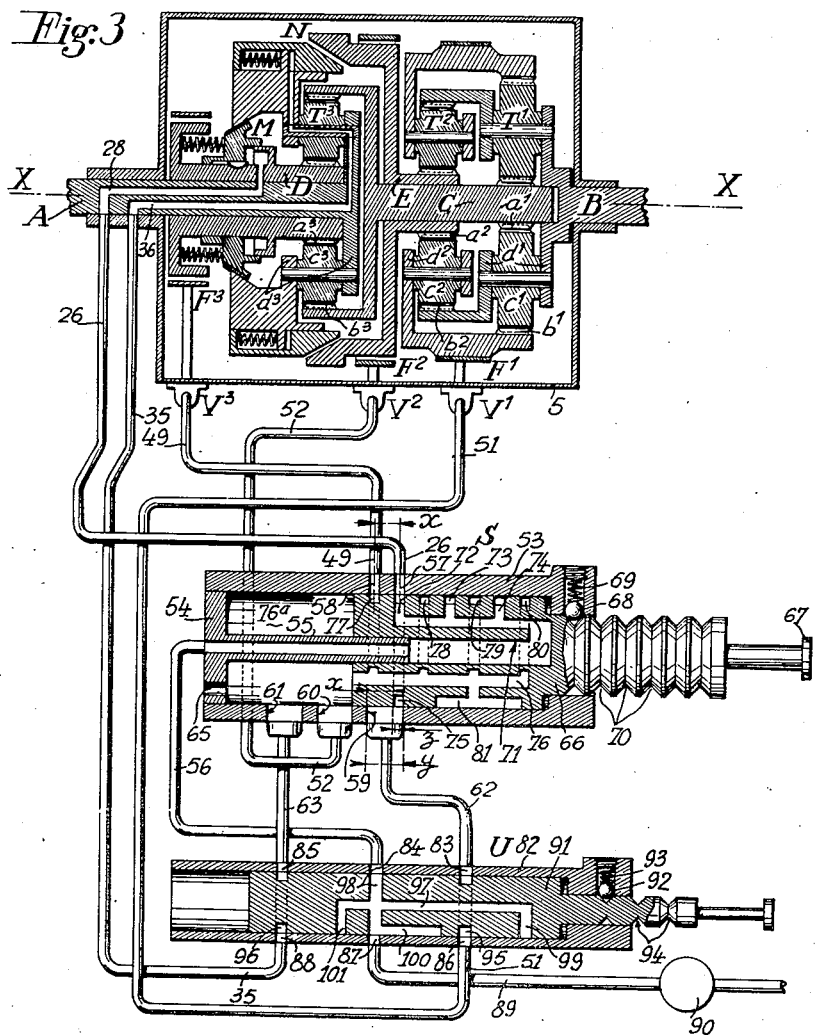
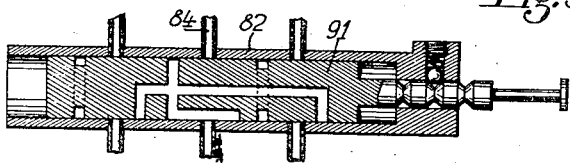
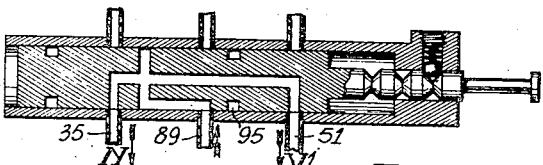
Inventor:
Jean Cavallier
by: J. Delattre-Seguy
Attorney June 18, 1957
J. CAVALLIER
2,795,972
SPEED CHANGE MECHANISM
Filed Sept. 23, 1953
3 Sheets-Sheet 3
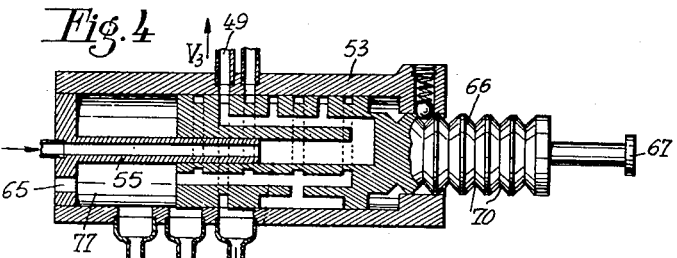
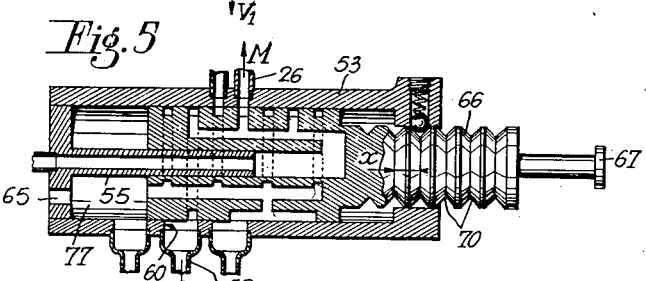
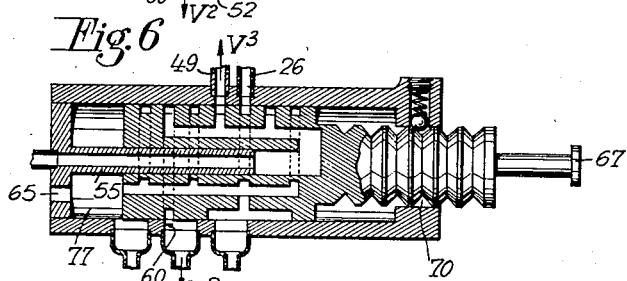
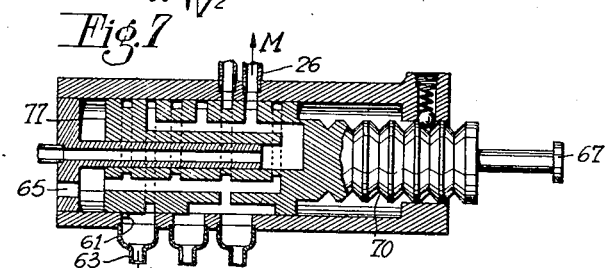
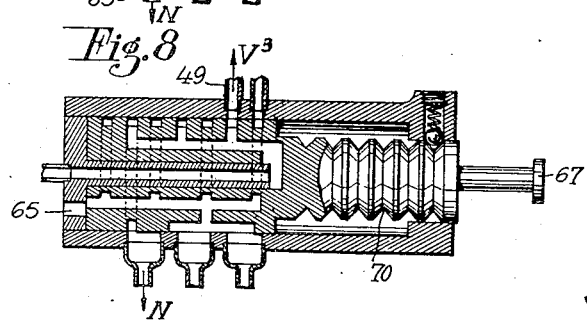
Inventor:
Jean Cavallier
by: J. Delattre-Seguy
Attorney

United States Patent Office 2,795,972
Patented June 18, 1957

2,795,972

SPEED CHANGE MECHANISM

Jean Cavallier, Blenod-les-Pont-a-Mousson, France, assignor to Compagnie de Pont-a-Mousson, Nancy (Meurthe & Moselle), France, a French body corporate Application September 23, 1953, Serial No. 381,817

Claims priority, application France September 30, 1952

2 Claims. (Cl. 74—759)

The present invention has for object to provide a speed change mechanism or gear box of the epicyclic gear type with which it is possible to obtain, by merely coupling three epicyclic gears and two clutch devices, seven different velocity ratios, that is seven different speeds of the driven shaft with a constant speed driving shaft, one of these speeds being in reverse.

The invention has for further object to provide a speed change mechanism which comprises, arranged between the driving shaft and the driven shaft, three epicyclic gears, each epicyclic gear having at least one member out of the members thereof consisting of the sun gear, the ring gear, and the planet gear support mounted to rotate freely but combined with a brake device, a first and a second of these epicyclic gears being operatively connected in that one of said members of each of these two epicyclic gears is fixed in rotation to another of said members of the other epicyclic gear, one of said members of the first epicyclic gear being connected to the driven shaft, the third epicyclic gear constituting a step-up or gearing-up gear introduced between the driven shaft and said operatively connected epicyclic gears, one of said members of the third epicyclic gear being permanently connected to one of said members of the first epicyclic gear and another of said members of the third epicyclic gear being permanently connected to the driving shaft, this last-mentioned member being combined with two clutch devices one of which permits the connection thereof to that one of said members of the third epicyclic gear which is mounted to rotate freely while the other of said two clutch devices permits the connection thereof to that one of said members of the second epicyclic gear which is mounted to rotate freely.

The invention has for further object to provide the combination of this speed change mechanism with a manually or automatically operated control mechanism and in particular a manually operated mechanism comprising in series a selector-distributor for all the six speeds except the speed in reverse, and a reverser-distributor having three settings and interposed between the selector-distributor and a source of control fluid under pressure for the speed change mechanism, this reverser-distributor ensuring, depending on its setting, either the delivery of the control fluid to the selector-distributor and thence to the speed change mechanism for all said six speeds, or the cutting-off of the control fluid from the selector-distributor in its "neutral" setting, or a short-circuiting of the selector-distributor and the delivery of the control fluid directly to the speed change mechanism in its "reverse" setting for the speed in reverse.

Further features and advantages of the invention will become apparent from the ensuing description.

In the accompanying drawings, given solely by way of example:

Fig. 1 is a longitudinal sectional view of a gear box or speed change mechanism improved in accordance with the invention, Fig. 2 is a partial transverse sectional view thereof along line 2—2 of Fig. 1, which shows one of the brake devices and the fluid motor control therefor, Fig. 3 shows diagrammatically in section the gear box illustrated in Fig. 1 in combination with a manually operated control mechanism, Figs. 4 to 8 represent the selector-distributor device, which forms part of the control mechanism, and show the position its piston occupies corresponding to the second, third, fourth fifth and sixth speed respectively, and Figs. 9 and 10 show the reverser-distributor with its plunger in the neutral and reverse drive positions respectively, which in combination with the aforementioned selector-distributor completes the control mechanism.

In the foregoing figures for purposes of clarity capital letters have been employed to designate the five shafts of the mechanism, the axes of movement, and the various complete devices, small letters have been employed for the active members of the epicyclic trains, and numerals for the various members, parts, surfaces, etc.

In order to facilitate the description and to render the latter and the claims more clear, the left side of the speed charge mechanism will be termed the input side and the right side thereof will be termed the output side. Hence references to "input" and "output" in the ensuing description and claims indicate that part of the member in question nearest to the input or output side of the speed change mechanism.

According to the embodiment illustrated in detail in Figs. 1 and 2 and diagrammatically in the upper part of Fig. 3, the speed change mechanism or gear box according to the invention is arranged to couple driving or input shaft A and a driven or output shaft B. These shafts are coaxial along axis XX and are combined with an intermediate shaft C disposed between shafts A and B along axis XX, and with auxiliary shafts D and E which are respectively concentric with shafts A and C upon which they are rotatively mounted.

The driving and driven shafts A and B are journalled through the medium of anti-friction bearings, represented in the drawings by ball bearings 1 and 2, in the front and rear covers 3 and 4 of a housing 5.

The output end of the driving shaft A is centrally journalled at 6 in shaft C (Fig. 1) and the latter is centrally journalled at 7 in the driven shaft B.

The five shafts A, B, C, D, E, are operatively connected in rotation by the combination of three epicyclic gear trains $T^1$, $T^2$, $T^3$ which are controlled by friction means or brakes $F^1$, $F^2$, $F^3$ actuated by linear fluid motors $V^1$, $V^2$, $V^3$ represented in the drawings in the form of cylinders and conjugate pistons, and by two clutch mechanisms M and N.

The first epicyclic gear train $T^1$ operatively connects the intermediate shaft C and the driven shaft B, and comprises:

A central sun gear $a^1$ provided at the output end of the intermediate shaft C;

A ring gear constituted by the internal gear teeth $B^1$ provided in an annular wheel 8 which includes a centrally located boss 9 that is fitted into an anti-friction bearing e. g. into the inner race of a ball bearing 10, this boss including a centrally located bore in which is journalled the shaft E;

Planet gears $c^1$ in mesh with the sun gear $a^1$ and the ring gear $b^1$ and rotatively mounted on pins 11 carried by a planet gear support cage $d^1$.

This planet gear support cage $d^1$ is formed of the combination of a flange integral with, that is forming part of or fixed to, the input end of the driven shaft B and a parallelly disposed flange carried by a ring 12 concentric with the axis XX.

The second epicyclic gear train $T^2$ is operatively connected to the gear train $T^1$ in such manner that the ring gear of each constitutes the planet gear support of the other.

The gear train $T^2$ comprises:

A sun gear $a^2$ cut into or fixed to the auxiliary shaft E;

A ring gear $b^2$ cut into the ring 8 forming one of the flanges of the planet gear support $d^1$ of the gear train $T^1$;

Planet gears $c^2$ whose spindles or pins 13 are carried by a planet gear support cage $d^2$ which is integral with, that is rigidly secured to or forming part of, the ring 8 and is in consequence integral with the ring gear $b^1$ of the gear train $T^1$.

The band of the brake $F^1$, controlled by the linear motor $V^1$ operated by oil or other fluid, is disposed on the ring 8 that constitutes the ring gear $b^1$ of the gear train $T^1$ and the planet gear support $d^2$ of the gear train $T^2$. The band of the brake $F^2$ controlled by the linear motor $V^2$ is disposed on a ring 14 carried by a flange 15 integral with the input end of the auxiliary shaft E.

The third epicyclic gear train $T^3$ is arranged in series with the operatively connected gear trains $T^1$ and $T^2$, between the latter and the driving shaft A. It comprises:

A sun gear $a^3$ cut into or fixed to the output end of the auxiliary shaft D;

A ring gear constituted by the internal teeth $b^3$ provided in the cylindrical periphery of a flange 16 carried by the input end of the intermediate shaft C;

Planet gears $c^3$ whose spindles or pins are carried by a planet gear support $d^3$, the latter comprising a flange 18 fixed in rotation with the output end of the driving shaft A, and a plate 19 centrally disposed on the auxiliary shaft D.

The planet gear support $d^3$ and hence the shaft A and the plate 19, may be locked in rotation either to the auxiliary shaft D by means of the clutch mechanism M, it being possible to lock the latter shaft by a brake $F^3$ actuated by a fluid motor $V^3$, or to the other auxiliary shaft E by means of the clutch mechanism N.

The clutch mechanism M (Fig. 1) comprises a plate 20 slidably keyed at 21 to the auxiliary shaft D, and a ring 22 fixed to the plate 19. Springs 23 tend to disengage the clutch mechanism M, whereas the engagement of this clutch is achieved by admission of oil or other fluid under pressure between the plate 19 of the planet gear support $d^3$ and the plate 20 whose periphery is slidably mounted in a fluid-tight manner in a recess 25 in the plate 19. The fluid is admitted between the two plates 19 and 20 through an inlet pipe 26 connected to a member 27 secured to the cover 3 of the housing, thence through a conduit 28 in the shaft A and through an annular recess 29 and a conduit 30 provided in the auxiliary shaft D. Hence, when the fluid under pressure is admitted between the two plates 19 and 20 the latter plate, which acts in the manner of a piston, is displaced to the left as viewed in Fig. 1 in opposition to springs 23 and the clutch engagement between the planet gear support $d^3$ (i. e. the driving shaft A) and the auxiliary shaft D is accomplished.

The other clutch mechanism N, with which it is possible to lock the plate 19, and consequently the planet gear support $d^3$ and the shaft A, to the second auxiliary shaft E, comprises a clutch surface 31 carried by the flange 15 of the shaft E and a conjugate surface 32 provided on a ring 33 slidably keyed to the plate 19 and planet gear support $d^3$ of the gear train $T^3$. The ring 33 is urged by springs 34 in the direction to disengage the clutch and in the direction of clutch engagement by a fluid under pressure introduced, through a second pipe 35, between the plate 19 and the ring 33. This pipe 35 communicates through an annular recess in the member 27 with a second conduit 36 in the shaft A. This conduit 36 communicates through a conduit 37 provided in the flange 18, a conduit in one of the planet gear pins 17 and a conduit 39 provided in the plate 19, which forms a fixed piston, with an annular space provided between the plate 19 and the ring 33 which constitutes a movable cylinder.

Reference will now be had to Fig. 2, which represents by way of example one of the brakes, namely $F^3$, and its associate fluid motor $V^3$. The brake $F^3$ is of the flexible band type. The flexible band 40 is adapted to be tightened on the periphery of a flange 41 which is integral with, that is forms part of or is secured to, the input end of the auxiliary shaft D. One of the ends of the brake band is secured to the housing by a pin 42 and the other end thereof is fixed at 43 to a bar 44. This bar is rigidly fixed to the piston 45 of the linear fluid motor $V^3$ and passes through longitudinal slots 46 and 47 provided opposite each other respectively in the housing 5 and in the cylinder 48 of the motor $V^3$. This cylinder is secured to the outer wall of the housing 5. The motor $V^3$ is single-acting, and is connected at one end to a delivery and discharge conduit 49. The piston 45 is spring loaded by a spring 50 provided in the motor on one side of the piston. This spring acts in a direction to maintain the brake band in the released position in which the conduit 49 is acting as a discharge conduit. When fluid under pressure is delivered through the same conduit 49 to the motor $V^3$ the brake $F^3$ is applied and the auxiliary shaft D is locked thereby.

The brakes $F^1$ and $F^2$ are identical and their associated fluid motors $V^1$ and $V^2$ are fed by pipes 51 and 52.

The operation of the speed change mechanism will now be described. The relationships of the various elements of the mechanism for each of the latter's different gear positions will be considered in turn.

When neither the brakes nor the clutch mechanisms are supplied with fluid under pressure there is no positive connection apart from friction between the input shaft A and the output shaft B, and no power is transmitted.

To change to the first gear position:

The clutch M is engaged by admitting oil through the pipe 26 so that the planet gear support $d^3$ and the sun gear $a^3$ of the gear train $T^3$ are locked together and the shaft A is caused to be locked to the auxiliary shaft D;

The brake $F^1$ is progressively applied by admitting the controlling fluid through the pipe 51 into the motor $V^1$ and thereby locking together the sun gear $b^1$ of the gear train $T^1$ and the planet gear support $d^2$ of the gear train $T^2$.

Under these conditions the gear train $T^3$, whose planet gear support $d^3$ is locked with respect to the sun gear $a^3$ and which is thus neutralized, merely drives in rotation the ring gear $b^3$ and hence the intermediate shaft C at the rotative speed of the input shaft A. However, as a result of the action of the brake $F^1$ on the ring gear $b^1$ of the gear train $T^1$, the output shaft B rotates at a speed lower than that of the shafts A and C owing to the speed reduction or gearing down effect of the gear train $T^1$.

To change into second gear, which may be considered as geared up from the first gear, the brake $F^1$ remains applied and the brake $F^3$ is also applied by admitting fluid in the fluid motor $V^3$ while the clutch M is disengaged. Hence the sun gear $a^3$ of the gear train $T^3$ is locked and the rotative speed of the intermediate shaft C is increased owing to the fact that the gear train $T^3$ is brought into action. This gear train $T^3$ is connected in series with the gear train $T^1$ and thus plays the part of a step-up or gearing-up gear. The output shaft B rotates, then, at a higher speed than in the first gear.

To change into third gear, the gear train $T^3$ is returned to the neutral position it assumed in the first gear position (M engaged, $F^3$ released) and the brake $F^2$ is applied by admitting fluid into the fluid motor $V^2$ ($F^1$ is released). The intermediate shaft C rotates, as in the first gear position, at the same speed as the input shaft A as set forth hereinbefore, but owing to the fact that the ring 14 is braked the sun gear $a^2$ of the gear train $T^2$ is locked. Thus the planet gears $C^2$ of this gear train revolve round the sun gear $a^2$ displacing with them their cage $d^2$ which causes the ring gear $b^1$ of the gear train $T^2$ to rotate which in turn accelerates the rotation of the cage $d^1$, that is the driven shaft B.

The engagement of the fourth gear is accomplished in a similar manner to the second gear. Thus with the brake $F^2$ in the applied position, the brake $F^3$ is applied and the clutch M is disengaged. As a result of bringing into action the gear train $T^3$ the intermediate shaft C is accelerated with respect to the shaft A by the same ratio as between the first and second gears. Hence the ratio between the third and fourth gears is identical to that between the first and second gears.

To engage the fifth gear, or direct drive, the clutches M and N are engaged by admitting oil in the two pipes 26 and 33. The two auxiliary shafts D and E are thereby caused to rotate at the same speed as the input shaft A and as this is also true for the intermediate shaft C no relative motion is possible between the gear trains $T^1$ and $T^2$. The output shaft B rotates therefore at the same speed as the input shaft A.

For the sixth gear or over-drive the clutch N is engaged and the brake $F^3$ is applied. The sun gear $a^3$ is locked and the planet gear support $d^3$ of the gear train $T^3$ is locked in rotation with the sun gear $a^2$ of the gear train $T^2$ while the sun gear $a^1$ of the gear train $T^1$ continues to be driven by the shaft A but with an increased speed due to the effect of the gear train $T^3$. The different speeds of the sun gears, $a^1$ and $a^2$ give in combination the desired over-drive to the output shaft B.

To obtain the reverse gear, the brake $F^1$ is applied and the clutch N is engaged. Under these conditions the auxiliary shaft D is free while the rotation of the input shaft A is transmitted directly to the auxiliary shaft E and to the sun gear $a^2$ of the gear train $T^2$ while the latter's planet gear support $d^2$ is locked by the brake $F^1$. The movement is therefore transmitted to the ring gear $b^2$ of the gear train $T^2$ and thence to the output shaft B which is locked thereto.

Calculation will demonstrate the following:

1. With these ratios: $R_1$ less than unity, representing the velocity ratio between the first gear and the direct drive; $R_3$ also less than unit, representing the velocity ratio between the third gear and the direct drive; and $r$ greater than unity representing the overdrive gear train $T^3$; the introduction of the gear train $T^3$ for the second and fourth gears gives the following:

$$R_2 = R_1 \times r \text{ for the second gear}$$
$$R_4 = R_3 \times r \text{ for the fourth gear}$$

In all cases there is obtained $$R_1 < R_2 < R_3 < R_4 < 1$$

with ratios $$\frac{R_3}{R_2} = r'$$

and $$\frac{1}{R_4} = r''$$

where $r'$ and $r''$ are greater than unity, depend on the gear trains, and may be equal to $r$.

2. The sixth gear is a step-up or overdrive gear having a ratio $R_6$ which is less than $r$ owing to the fact that the shaft B is driven in parallel by the trains $T^1$ and $T^2$ as hereinbefore set forth. This is advantageous since with the small amount of step-up of the sixth gear it is to a certain extent possible to profit from the general advantages of overdrives as regards economical running and decreased wear of the engine (which runs at a lower speed) without decreasing overmuch the liveliness of the latter.

3. Whatever be the diameters of the elements of the three epicyclic gear trains, the rotative speed of the output shaft B increases progressively by stages through the different ratios which are of course governed by the relative sizes of the gear elements.

To summarize, the following table may be compiled:

| Clutch or Brake engaged | Gear obtained | Ratio to the direct drive | Ratio between successive gears |
|---|---|---|---|
| M—$F^1(V^1)$ | 1st gear | $R^1$ | $r>1$ |
| $F^3(V^3)$—$F^1(V^1)$ | 2nd gear | $R^2$ | $r''>1$ |
| M—$F^2(V^2)$ | 3rd gear | $R^3$ | $r$ |
| $F^3(V^3)$—$F^2(V^2)$ | 4th gear | $R^4$ | $r'''>1$ |
| M—N | 5th gear (direct drive) | 1 | $R^6<r$ |
| N—$F^3(V^3)$ | 6th gear (overdrive) | $R_6$ | |
| N—$F^1(V^1)$ | Reverse gear | | |

It will be observed that in a motor vehicle the speed change mechanism may be mounted directly behind the engine without need of a clutch between the latter and the mechanism. The first gear is engaged by engaging the clutch M and the brake $F^1$, and the only requirement is that one of these engagements should be effected progressively if the vehicle is to be driven away from start.

The operation of the gear box or speed change mechanism, that is the operation of the brakes $F^1$, $F^2$, and $F^3$ and the clutches M and N, in accordance with the foregoing table may be accomplished either manually or automatically.

The description of the speed change mechanism will now be completed by a brief description of a manually operated control device which has been illustrated by way of example in Figs. 3 to 10.

This control device comprises a selector-distributor S and an inverser-distributor U.

The selector-distributor S includes a cylinder 53 closed at its left end as viewed Fig. 3. by an end member which is axially extended by a tube portion 55 constituting the delivery conduit for the control fluid under pressure. This tube 55 is for this purpose connected by a pipe 56 to the inverser-distributor U. The cylindrical wall of the selector-distributor S further comprises two ports 57 and 58 spaced apart by an amount $x$. Pipes 26 (clutch M) and 49 (fluid motor $V^3$ associated with the brake $F^3$) are respectively connected to these ports. Further ports are provided in the cylinder 53 in circumferentially spaced relationship to the ports 57 and 58, for example in the same diametral plane as the latter. These ports 59, 60 and 61, each have a length in the direction of the axis of the cylinder 53 equal to $x+z$, where $z$ equals the diameter of the ports 57 and 58. The distance between these ports 59, 60 and 61 is equal to that between the ports 57 and 58.

A pipe 62 leading from the inverser-distributor U is connected to the port 59, and the delivery pipe 52 of the fluid motor $V^2$ (brake $F^2$) is connected to the port 60. The port 61 is connected by a pipe 63 to the inverser-distributor U.

The end member 56 comprises a discharge port 65 through which the oil or other control fluid returns to the reservoir from which the pump draws the control fluid.

Disposed in the cylinder 53 is an axially mobile distributor piston 66 which protrudes from the right end of the cylinder as viewed in Fig. 3. This piston is provided with a head 67 by means of which it may be displaced manually or by foot in direct manner or through the medium of any suitable transmission. The piston 66 is capable of occupying six different axial positions determined by the engagement of a ball 68, biased by a spring 69, in one of six recesses 70 provided in the piston. These recesses are axially equispaced, the distance between adjacent recesses being equal to the aforementioned distance $x$. An axial blind hole 71 is provided in the piston 66. This blind hole is in communication with the outer face of the piston through three outlets 72, 73 and 74 disposed in the piston in the same radial plane as the ports 57 and 58. The outlet 73 is axially spaced from the other outlets 72 and 74 a distance equal to $2x$. The outlet 72 is in communication with an annular recess 75 provided in the piston 66.

A further blind hole 76 is eccentrically disposed, with respect to the axial hole 71, in the piston 66. This hole 76 is in communication with the chamber $76^a$ located between the piston 66 and the end of the cylinder 53. The blind hole 76 is moreover in communication with four openings 77, 78, 79 and 80 disposed in the same radial plane as the outlets 72, 73 and 74, these openings being disposed in alternate manner between the outlets 72 and 73, so that in this common radial plane the outlets and openings are spaced apart a constant distance $x$, and for the six positions of the piston the pipes 26 and 49 become alternately delivery and exhaust pipes for the cylinder 53. The passage 76 is in communication with a further longitudinally extending opening 81 located in the same diametral plane as the ports 59 to 61.

The piston 66 has such length that for the position thereof corresponding to the engagement of the first gear the opening 77 and the outlet 72 are opposite the ports 58 and 57 respectively and the annular recess 75 is in communication with the right end of the port 59 as viewed in Fig. 3.

The inverser-distributor U comprises a fixed cylinder 82. Three axially equispaced ports 83, 84, 85 are provided in the cylinder 82 along a line parallel to the axis of the cylinder. Pipes 62, 56 and 63 are connected to these ports. Three other ports 86, 87 and 88 are provided in the cylinder 82 in the same transverse planes relative to the latter as the ports 83, 84 and 85 respectively and for example in the same diametral plane as the latter. There are respectively connected to these ports 86, 67 and 88: the pipe 51 of the fluid motor $V^1$ (brake $F^1$), a delivery pipe 89 for the fluid under pressure provided by a pump 90, and the delivery pipe 35 of the clutch mechanism N.

Inside the cylinder 82 is slidable a plunger 91. This plunger may be held in three axial positions by a ball 92 biassed by a spring 93 in the direction of one of three annular recesses 94 provided in the plunger. The plunger is also provided with two annular recesses 95 and 96 and an axially extending bore 97. This bore is in communication, through an aperture 98 provided in the plunger, with any one of the ports 83 to 85 depending on the position of the plunger. The aperture 98 and the ports 83 to 85 lie in the same radial plane relative to the cylinder 82. The bore 97 is also in communication, in certain positions of the plunger 91, with the ports 86 to 88 through an aperture 99, a longitudinally extending recess 100, and an aperture 101, provided in the plunger 91. The ports 86 to 88, the apertures 99 and 101, and the recess 100 all lie in the same radial plane relative to the cylinder 82.

The operation of the complete system will now be described.

1. *First-sixth gears.*—The plunger of the inverser-distributor U is in the position shown in Fig. 3 and the delivery pipe 89 is in communication with the pipe 56 and the axial tube 55 of the inverser-distributor. The pipe 62 is connected by the annular recess 95 to the pipe 51. The pipes 63 and 35 are connected by the annular recess 96.

For this position of the plunger of the inverser-distributor U the six gear positions are obtained by shifting the piston 66 of the selector-distributor S so that the ball 68 falls into any one of the recesses 70.

For the positions illustrated in Fig. 3 the first gear is engaged because the clutch mechanism M is supplied with fluid under pressure through the hydraulic circuit 89, 56, 55, 71, 72 and 26, and the fluid motor $V^1$ of the brake $F^1$ is supplied with fluid under pressure through the hydraulic circuit 89, 56, 55, 71, 75, 59, 62, 83, 95, 86 and 51.

For the position of the piston of the selector-distributor S shown in Fig. 4, the second gear is engaged, since the fluid motors $V^1$ and $V^3$ are subject to the fluid pressure in a similar manner.

By shifting the piston 66 a distance $x$ to the left as viewed in the drawings, the condition illustrated in Fig. 5 is obtained, in which the fluid under pressure is admitted into the clutch mechanism M through the pipe 26, and into the fluid motor $V^2$ of the brake $F^2$ through the port 60 and the pipe 52.

A further displacement $x$ to the left of the piston 66 (Fig. 6) puts the speed change mechanism in fourth gear, by changing once more the fluid flow directions in the pipes 26 and 49. Hence the fluid motor $V^3$ is once more fed with fluid while the fluid motor $V^2$ continues to be fed owing to effect of the axial length of the port 60.

Fig. 7 represents the fifth gear position of the piston 66. The pipe 26 is once more fed with fluid under pressure and with it the clutch mechanism M, while fluid under pressure is also delivered to the clutch mechanism N through the port 61 and the pipe 63.

Finally, in shifting the piston 66 one more notch to the left (Fig. 8) the pipe 49 is once more supplied with the control fluid instead of the pipe 26 and the speed change mechanism is put in sixth gear, for the control fluid is supplied to the fluid motor $V^3$ and to the second clutch mechanism N.

2. *Neutral position.*—When the plunger of the inverser-distributor U is shifted to the position shown in Fig. 9 all pipes in communication with the selector-distributor are obturated, as is moreover the pipe 89 from the pump 90.

3. *Reverse gear.*—Irrespective of the position of the piston 66 of the selector-distributor S, when the plunger of the inverser-distributor U is shifted to the position shown in Fig. 10 the control fluid delivered by the pipe 89 is admitted through the pipes 51 and 35 into the fluid motor $V^1$ and the clutch mechanism N. The selector-distributor is thereby short-circuited.

Although a specific embodiment of the invention has been described hereinbefore, it is to be understood that many changes and modifications may be made therein without departing from the spirit of the invention or the scope of the appended claims.

Having now described my new invention what I claim as new and desire to secure by Letters Patent is:

1. In a speed change mechanism having six speeds of which one constitutes a direct drive and one an overdrive and having a further speed in reverse, in combination: a driving shaft A; a driven shaft B; a first epicyclic gear $T^1$; a second epicyclic gear $T^2$; a third epicyclic gear $T^3$, each epicyclic gear comprising four members namely respectively a sun gear $a^1$, $a^2$, $a^3$, a ring gear $b^1$, $b^2$, $b^3$, at least one planet gear $c^1$, $c^2$, $c^3$ and a planet gear support $d^1$, $d^2$, $d^3$, said planet gear rotatably mounted on said support meshing with said sun and ring gears, one of the members $b^1$, $a^2$ and $a^3$ consisting of said sun and ring gears and planet gear supports of each of the three epicyclic gears being a freely rotative member; three brake devices $F^1$, $F^2$, $F^3$ adapted to brake each one of said freely rotative members and two clutch devices M, N; said first and second epicyclic gears $T^1$, $T^2$ being operatively connected in that one of the members $b^1$, $b^2$ of each one of them is fixed in rotation to another member $d^2$, $d^1$ of the other of these epicyclic gears, one of the members $d^1$ of the first epicyclic gear $T^1$ being connected to said driven shaft B, while the third epicyclic gear $T^3$ which consitutes a step-up gear is interposed between said driving shaft A and said operatively connected epicyclic gears $T^1$, $T^2$ in that, on the one hand, one of its members $b^3$ is permanently connected to one of the member $a^1$ of the first epicyclic gear $T^1$ and on the other hand another member $d^3$ of said third epicyclic gear is permanently connected to the driving shaft A, and through said clutch devices M, N respectively to the freely rotative members $a^3$ of said third epicyclic gear $T^3$ and $a^2$ of said second epicyclic gear $T^2$.

2. On a speed change mechanism having six speeds of which one constitutes a direct drive and one an overdrive and having a further speed in reverse, in combination: a driving or input shaft A; a driven or output shaft B; an intermediate shaft C located between the driving shaft A and the driven shaft B, these three shafts having the same longitudinal axis; a first auxiliary shaft D freely rotatively mounted on the driving shaft A; a second auxiliary shaft E freely rotatively mounted on said intermediate shaft C; two brakes $F^3$ and $F^2$ adapted to brake respectively said first and second auxiliary shafts D and E; a first epicyclic gear $T^1$ comprising a sun gear $a^1$ carried by the output end of the intermediate shaft C, a planet gear support $d^1$ integral with the driven shaft B, a freely rotative ring gear $b^1$ and at least a planet gear $c^1$ rotatably mounted on said support and meshing with said sun and ring gears; a brake $F^1$ adapted to brake said ring gear $b^1$; a second epicyclic gear $T^2$ comprising a sun gear $a^2$ carried by the output end of said second auxiliary shaft E, a planet gear support $d^2$ integral with said ring gear $b^1$ of said first epicyclic gear $T^1$, a ring gear $b^2$ which is integral with the planet gear support $d^1$ of said first epicyclic gear $T^1$ and hence with the driven shaft B and at least a planet gear $c^2$ rotatably mounted on said support $d^2$ and meshing with said sun $a^2$ and ring $b^2$ gears; a third epicyclic gear $T^3$ comprising a sun gear $a^3$ integral with said first auxiliary shaft D, a ring gear $b^3$ integral with the input end of the intermediate shaft C, a planet gear support $d^3$ integral with the driving shaft A and at least a planet gear $c^3$ rotatably mounted on said support $d^3$ and meshing with said sun $a^3$ and ring $b^3$ gears, and two clutch devices M and N adapted to connect said planet gear support $d^3$ of the third epicyclic gear $T^3$ and the driving shaft A respectively to the first and the second auxiliary shafts D and E.

References Cited in the file of this patent

UNITED STATES PATENTS

| | | |
|---|---|---|
| 2,159,427 | Dunn | May 23, 1939 |
| 2,162,785 | Neracher et al. | June 20, 1939 |
| 2,259,732 | Burtnett | Oct. 21, 1941 |
| 2,516,203 | Greenlee et al. | July 25, 1950 |
| 2,608,880 | Flinn | Sept. 2, 1952 |

FOREIGN PATENTS

| | | |
|---|---|---|
| 598,806 | Great Britain | Feb. 26, 1948 |